United States Patent Office 3,162,525
Patented Dec. 22, 1964

3,162,525
METHOD FOR THE CONTROL OF
PLANT GROWTH
John Keith Leasure, Midland, Mich., assignor to The Dow Chemical Company, Midland, Mich., a corporation of Delaware
No Drawing. Filed Apr. 6, 1962, Ser. No. 185,518
8 Claims. (Cl. 71—2.7)

This invention is concerned with the control of undesired vegetation and is particularly directed to a composition and method for suppressing the growth of germinant seeds and for accomplishing foliage kill of plants.

In accordance with the present invention, it has been discovered that germinant seeds and the above-ground portions of many plants are effectively controlled by contacting the plant or plant parts with a herbicidal amount of an aminooxyaliphatic acid having the formula

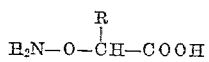

$$H_2N-O-CH-COOH$$

wherein R represents hydrogen or a methyl radical, or a salt thereof. It is among the advantages of the invention that the active herbicidal agents are effective against a wide array of plant species, including both representative grasses and broadleaf plants.

The aminooxyaliphatic acids employed in the invention are amphoteric in nature and may be employed either in the form of the metal carboxylate salts, such as the alkali metal or amine salts, or in the form of acid salts, such as the aminooxyaliphatic acid hydrochloride, hemihydrochloride, hydrobromide, salts with sulfuric acid or the like. The selection of the particular salt employed does not appear to be critical, however, the water-soluble salts are preferred for ease of formulation and application.

In carrying out the invention, the aminooxyaliphatic acid or a salt thereof is dispersed in any suitable fashion so as to contact the plant or plant part to be controlled with a herbicidal amount of said active compound. Thus, for the control of germinant seed, it is convenient to distribute the aminooxyaliphatic acid salt in the soil or other seed bed medium so as to contact the germinating plant as or after it emerges from the seed. Alternatively, after emergence of seedlings, the aminooxyaliphatic acid or a salt thereof is distributed so as to give thorough coverage of the foliage or above-ground portion of the plants to be controlled.

For soil treatment operations, the aminooxyaliphatic acid or a salt thereof may be admixed with finely-divided solid diluents such as pyrophyllite, clay, diatomaceous earth, volcanic ash, wood flour and the like to prepare granular or dust compositions. Similarly, the active phytotoxic compounds may be dispersed on fertilizers or soil conditioning additaments. The mixtures of the aminooxyaliphatic compound with solid diluents may be prepared by mechanically mixing or grinding the undiluted active ingredient with the desired solid diluent. Alternatively, the aminooxyaliphatic compound may be dissolved in a suitable solvent, preferably a readily volatilizable solvent, and dispersed on the solid diluent, the solvent being evaporated during or after the mixing operation. The proportion of active aminooxyaliphatic acid or salt to solid diluent is not critical provided only that a herbicidal amount of the active compound is applied. In general, good results are obtained with solid granular or dust compositions containing from about 1 to 50 percent by weight of the active phytotoxic agent.

In the application of solid compositions, as described above, conventional equipment may be employed. Thus, for example, a dust or granular composition may be spread on or drilled into the surface of the soil and dispersed through the upper 2 to 6 inches thereof by discing or harrowing and dragging the treated area. Alternatively, the solid composition may be spread on the surface of the soil and dispersed into the upper layers thereof by overhead irrigation or the like.

In the use of spray compositions, it is generally desirable to apply the active aminooxyaliphatic acid or salt in the form of an aqueous solution or dispersion thereof, preferably including sufficient of a wetting, dispersing or spreading agent to facilitate prompt penetration of seed bed media and the efficient wetting of foliage. In general, it is desirable that such aqueous compositions contain at least about 0.01 percent by weight of active aminooxyaliphatic acid or the equivalent thereof in salt form, although concentrations as low as 0.0002 percent by weight conveniently can be employed in irrigation treatments of soil. Other and higher concentrations, up to the limit of solubility of the active acid or salt, may be employed, depending upon such factors as the type of equipment employed to distribute the herbicidal composition and the type of and stage of growth of the vegetation to be controlled. Preferred aqueous compositions for direct application to plants or plant parts comprise aqueous solutions containing from about 0.01 to about 5 percent by weight of an aminooxyaliphatic acid or the equivalent amount of a salt thereof and from about 0.01 to about 0.2 percent by weight of a wetting agent.

Any suitable wetting or dispersing agent may be used in the compositions of the invention provided that it has the property of lowering the interfacial tension between an aqueous solution thereof and a waxy surface and provided that it is not reactive with the active herbicidal agent. Representative wetting and dispersing agents include alkali metal salts of long chain aliphatic sulfates and alkylaryl sulfonates, wholly or partially neutralized sulfuric acid derivatives of petroleum oil and of naturally-occurring glycerides, soaps, and polyoxyalkylene derivatives of phenols, of fatty acids, of fatty alcohols, of alkanolamines and of sorbitan-fatty acid condensation products and the like.

In field operations for the control of germinant seed of undesired vegetation, it is generally sufficient to apply from about 2 to about 20 pounds of the aminooxyaliphatic acid or salt per acre, although amounts of up to 50 pounds or more per acre may be required for resistant species. Such applications may be made by applying the active herbicidal agent in sufficient water to accomplish the desired degree of penetration into the seed-bearing layer of the soil or other growth media. Alternatively, the active aminooxyaliphatic acid or salt thereof may be applied at the above rate directly to the soil or with an inert solid carrier and distributed into the upper layer of soil by cultivation methods such as by use of a harrow, disc or rotary tiller device. In such operations, it is generally desirable to accomplish the distribution of the active compound through the upper 2 to 6 inches of the soil. In some cases, dispersion of the active agent into the seed germination zone may be accomplished by distribution of the active compound, with or without an inert carrier, on the soil surface followed by irrigation to wash the active agent into the desired depth of soil.

The exact quantity of aminooxyaliphatic acid or salt thereof to be employed will vary depending upon the type and stage of growth of the vegetation to be controlled, the temperature at the time of the treatment, the type of soil involved, and the like. Good results as regards control of germinant seed have been obtained when employing from about 2 to 50 pounds or more of the active agent per acre of soil, distributed in the upper 2 to 6 inches of soil, as set forth above, to provide concentrations of from about 1 to about 80 parts by weight of aminooxyaliphatic acid per million parts of soil. For contact action on the above-ground parts of plants, good results have been obtained when employing sprays containing from about 1 to about 10 pounds of the active aminooxyaliphatic acid or salt per 100 gallons of finished spray and applying the spray solution so as to obtain substantial coverage of the above-ground portions of the vegetation to be controlled.

The quantity of treating composition to be applied may vary considerably provided that the required dosage of active ingredient is applied in sufficient of the finished composition to cover adequately the vegetation to be treated or to facilitate the penetration and distribution of said ingredient in growth media. The required amount of the active ingredient in the soil conveniently may be supplied per acre treated in from 10 to 27,000 gallons or more of the liquid carrier or in from 50 to 2,000 pounds of the inert solid carrier. In the treatment of seedling weeds, good coverage is obtained when using from 10 to 60 gallons of finished spray composition per acre. Where large succulent vegetation is concerned, it is frequently desirable to employ up to 250 gallons or more of the finished spray composition per acre to assure complete coverage of the above-ground portion of the vegetation.

The following examples illustrate the invention but are not to be construed as limiting the same.

*Example 1*

Four parts of the hemihydrochloride of 2-aminooxyacetic acid, 0.08 part of sorbitan trioleate (Span 85) and 0.02 part of a sorbitan monolaurate polyoxyethylene derivative (Tween 80) were dispersed in 40 milliliters of acetone to produce a concentrate composition in the form of a water-dispersible liquid. A portion of this concentrate composition was dispersed in water to produce an aqueous spray composition containing 0.5 percent by weight of the active hemihydrochloride compound. The resulting aqueous composition was applied by spraying so as to wet thoroughly the above-ground portion of actively growing stands of redroot pigweed, cucumber, radish, German millet, Japanese millet, marigold, Sudan grass and crabgrass plants. The plants averaged 2 to 4 inches in height when sprayed. Thereafter, all plants were maintained under good growing conditions in a greenhouse together with untreated check plants of the same species. About 10 days after application of the spray, it was observed that all the sprayed plants were dead, while the untreated check plants were growing vigorously.

In an exactly similar operation on tomato plants, except that the concentration of the hemihydrochloride of 2-aminooxyacetic acid in the spray composition was 0.4 percent by weight, complete kill of the tomato plants was obtained.

*Example 2*

The procedure of Example 1 was repeated except that the concentration of the hemihydrochloride of 2-aminooxyacetic acid in the aqueous spray composition was reduced to 0.2 percent by weight (1.67 pounds per hundred gallons) and the spray was applied to pigweed, cucumber, radish, marigold, German millet and crabgrass plants. Complete kill of the above-ground portions of all sprayed plants was obtained.

*Example 3*

A portion of the concentrate composition of Example 1 was dispersed in water to produce an aqueous composition containing 0.432 pound of the hemihydrochloride per 100 gallons of ultimate mixture. The latter was employed to treat areas of fertile loam soil which had been fitted and planted with seed of radish, German millet, milo (sorghum) and Japanese millet. In the treating operation, the aqueous composition was applied as a soil drench at a rate of about 0.434 acre-inch of such aqueous composition per acre to supply a dosage of about 50 pounds of the hemihydrochloride of 2-aminooxyacetic acid per acre. This dosage corresponded to a concentration of about 80 parts by weight of the aminooxyacetic acid compound per million parts by weight of soil. Other areas similarly seeded with the named plant species were left untreated to serve as checks. The treated and untreated seed beds were thereafter maintained under good growing conditions in a greenhouse.

On observation about two weeks after the above treatment, it was found that the named plant species were growing vigorously in the untreated check areas while complete kill of germinant seed and emerging seedlings of radish, milo and Japanese millet were obtained in the treated areas. In such areas, over 90 percent control of German millet was obtained and the surviving plants were chlorotic and stunted.

*Example 4*

Portions of the concentrate composition of Example 1 were dispersed in water to produce aqueous compositions containing 0.0432 and 0.172 pound of the hemihydrochloride of 2-aminooxyacetic acid per 100 gallons of ultimate mixture. These aqueous compositions were applied to soil areas by the procedure of Example 3 at a rate of about 0.434 acre-inch of aqueous composition per acre to supply substantially uniform dosages of about 5 to 20 pounds, respectively, of the aminooxyacetic acid compound per acre. These dosages correspond, respectively, to applications of about 8 and 32 parts by weight of the hemihydrochloride of 2-aminooxyacetic acid per million parts by weight of soil. The treated soil areas had previously been planted with seed of redroot pigweed, cucumber, German millet, marigold and crabgrass. Other areas similarly seeded with the named plant species were left untreated to serve as checks.

After maintenance under good growing conditions for about two weeks, the areas were examined to ascertain what control of the growth of seeds and emerging seedlings had been obtained. The results are set forth in the following table:

| Seed Species | Percent control of Growth of Germinant Seed and Emerging Seedlings at the Indicated Concentration of Toxicant in the Treated Seed Beds | |
|---|---|---|
| | 8 p.p.m. | 32 p.p.m. |
| Pigweed | 100 | 100 |
| Cucumber | 98 | 95 |
| German Millet | 99 | 95 |
| Marigold | 100 | 99 |
| Crabgrass | | 95 |

At the time of the observations, the untreated check beds were found to support luxuriant and vigorously growing stands of the named plant species.

*Example 5*

A water-dispersible concentrate composition similar to that of Example 1 was prepared employing the hydrochloride of 2-aminooxypropionic acid as the herbicidal toxicant. A portion of the resulting concentrate was dispersed in water to produce an aqueous composition containing 0.432 pound of the hydrochloride of 2-aminooxypropionic acid per 100 gallons of ultimate mixture. This aqueous composition was applied as a soil drench, as described in Example 3, for the treatment of soil previously planted with seed of radish, peas, milo (sorghum) and Japanese millet. The treatment supplied a substantially uniform dosage of about 50 pounds of the hydrochloride of 2-aminooxypropionic acid corresponding to a concentration of about 80 parts by weight of the aminooxypropionic acid compound per million parts by weight of the treated soil. Other soil areas similarly planted with the named species were left untreated to serve as checks. All areas were maintained under good growing conditions.

After about 2 weeks, the areas were examined to ascertain what control of the growth of germinant seeds and emerging seedlings had been obtained. The results are set forth in the following table:

| Seed Species | Percent Control of Growth of Germinant Seeds and Emerging Seedlings in the Treated Beds |
| --- | --- |
| Radish | 100 |
| Pea | 100 |
| Milo | 95 |
| Japanese millet | 95 |

At the time of the observations, the check beds were found to support vigorously growing stands of the named plant species.

The term "plant part" as employed in the present specification and claims is intended to be inclusive of the stems, branches, roots, foliage and germinant seeds of the plants.

I claim:

1. A method for the control of plant growth which comprises spraying the above-ground portions of plants with an aqueous solution containing a herbicidal amount of a compound selected from the group consisting of aminooxyaliphatic acids having the formula $$H_2N-O-\underset{\underset{R}{|}}{C}H-COOH$$

wherein R is selected from the group consisting of hydrogen and methyl, and water-soluble alkali metal and hydrochloride, hydrobromide and sulfuric acid salts thereof.

2. A method according to claim 1, wherein the compound is applied in an aqueous spray at a concentration of from about 1 to about 10 pounds of said compound per 100 gallons of finished spray composition.

3. A method for the control of germinant seed in soil which comprises distributing through the upper 2 to 6 inches of the soil a compound selected from the group consisting of aminooxyaliphatic acids having the formula $$H_2N-O-\underset{\underset{R}{|}}{C}H-COOH$$

wherein R is selected from the group consisting of hydrogen and methyl, and water-soluble alkali metal and hydrochloride, hydrobromide and sulfuric acid salts of such acids, said compound being employed in an amount to provide from about 1 to about 80 parts by weight thereof per million parts by weight of soil.

4. A method according to claim 3, wherein the active herbicidal compound is distributed at the rate of from about 2 to 50 pounds per acre of soil surface.

5. A method for the control of plant growth which comprises contacting plant parts with a herbicidal amount of the hemihydrochloride of 2-aminooxyacetic acid.

6. A method for the control of plant growth which comprises contacting plant parts with a herbicidal amount of the sodium salt of 2-aminooxyacetic acid.

7. A method for the control of plant growth which comprises contacting plant parts with a herbicidal amount of the hydrochloride of 2-aminooxypropionic acid.

8. A method for the control of the growth of plants which comprises contacting plant parts with a herbicidal amount of a compound selected from the group consisting of 2-aminooxyacetic acid, 2-aminooxypropionic acid, and the alkali metal and hydrochloride, hydrobromide and sulfuric acid salts thereof.

References Cited in the file of this patent

Favour: "Chemical Abstracts," vol. 42, column 2316(a), 1948.

Audus et al.: "Nature," vol. 160, pages 222 and 223 (1955).